United States Patent
Swierc et al.

(10) Patent No.: US 10,831,471 B2
(45) Date of Patent: Nov. 10, 2020

(54) SOURCE CODE FILE RECOMMENDATION NOTIFICATION

(71) Applicant: Microsoft Technology Licensing, LLC, Redmond, WA (US)

(72) Inventors: Stanislaw Wiktor Swierc, Redmond, WA (US); Hitesh Shyamlal Sajnani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/040,431

(22) Filed: Jul. 19, 2018

(65) Prior Publication Data

US 2020/0026511 A1    Jan. 23, 2020

(51) Int. Cl.
  *G06F 9/44*    (2018.01)
  *G06F 8/71*    (2018.01)
  *G06F 9/451*   (2018.01)
  *G06F 16/27*   (2019.01)
  *G06N 20/00*   (2019.01)
  *G06F 17/18*   (2006.01)

(52) U.S. Cl.
  CPC .............. *G06F 8/71* (2013.01); *G06F 9/453* (2018.02); *G06F 16/27* (2019.01); *G06F 17/18* (2013.01); *G06N 20/00* (2019.01)

(58) Field of Classification Search
  CPC ....................................................... G06F 8/71
  USPC ....................................................... 717/120
  See application file for complete search history.

(56) References Cited

U.S. PATENT DOCUMENTS

| 5,897,642 | A  |    | 4/1999  | Capossela et al. |
|-----------|----|----|---------|-------------------|
| 6,256,773 | B1 |    | 7/2001  | Bowman-Amuah |
| 6,308,176 | B1 |    | 10/2001 | Bagshaw |
| 6,601,233 | B1 |    | 7/2003  | Underwood |
| 8,615,752 | B2 | *  | 12/2013 | Izard .................. G06F 8/71 717/168 |
| 9,430,229 | B1 | *  | 8/2016  | Van Zijst ............. G06F 9/3844 |

(Continued)

OTHER PUBLICATIONS

Park, et al., "An empirical study on reducing omission errors in practice", In Proceedings of 29th ACM/IEEE International conference on Automated software engineering, Sep. 15, 2014, pp. 121-126.

(Continued)

*Primary Examiner* — Evral E Bodden
(74) *Attorney, Agent, or Firm* — Alleman Hall Creasman & Tuttle LLP

(57) ABSTRACT

A computing device is provided, including a non-volatile storage device and a processor configured to execute a distributed version control system. The processor may, via the distributed version control system, receive a pull request to apply a first set of one or more source code files to a project database. In response to receiving the pull request, the processor may identify a second set of one or more source code files based at least in part on a recommendation ruleset including one or more association rules identified for a plurality of training pull requests applied to a training project database. The recommendation ruleset may be determined based at least in part on a respective last iteration of each training pull request. The processor may output a source code file recommendation notification including an indication of each source code file of the second set.

20 Claims, 9 Drawing Sheets

(56) References Cited

U.S. PATENT DOCUMENTS

| | | | | |
|---|---|---|---|---|
| 2005/0283778 | A1* | 12/2005 | Barton | G06F 9/4411 |
| | | | | 717/174 |
| 2006/0259524 | A1 | 11/2006 | Horton | |
| 2007/0016553 | A1 | 1/2007 | Dumais et al. | |
| 2007/0288910 | A1 | 12/2007 | Bhat et al. | |
| 2008/0082968 | A1 | 4/2008 | Chang et al. | |
| 2008/0120598 | A1 | 5/2008 | Imeshev | |
| 2008/0127089 | A1 | 5/2008 | Peretz et al. | |
| 2008/0127090 | A1 | 5/2008 | Best et al. | |
| 2009/0083268 | A1 | 3/2009 | Coqueret et al. | |
| 2009/0150542 | A1 | 6/2009 | Yahiro et al. | |
| 2010/0241469 | A1* | 9/2010 | Weigert | G06F 8/75 |
| | | | | 717/124 |
| 2010/0299305 | A1* | 11/2010 | Laxman | G06F 8/71 |
| | | | | 707/609 |
| 2012/0054857 | A1* | 3/2012 | Bisso | G06F 21/56 |
| | | | | 726/22 |
| 2014/0006555 | A1* | 1/2014 | Shields | H04L 67/12 |
| | | | | 709/217 |

OTHER PUBLICATIONS

Purushothaman, et al., "Toward Understanding the Rhetoric of Small Source Code Changes", In Journal of IEEE Transactions on Software Engineering, vol. 31, Issue 6, Jun. 2005, pp. 511-526.

Robillard, et al., "An introduction to recommendation systems in software engineering", In Proceedings of Recommendation Systems in Software Engineering, Apr. 2014, pp. 1-11.

Robillard, et al., "Recommendation systems for software engineering", In Journal of IEEE software, vol. 27, Issue 4, Jul. 2010, pp. 80-86.

Rutar, et al., "A Comparison of Bug Finding Tools for Java", In Proceedings of the 15th International Symposium on Software Reliability Engineering, Nov. 2, 2004, 12 Pages.

Sliwerski, et al., "Hatari: Raising Risk Awareness", In Proceedings of the ACM SIGSOFT Software Engineering Notes, vol. 30, Issue 5, Sep. 5, 2005, pp. 107-110.

Sliwerski, et al., "When Do Changes Induce Fixes", In Proceedings of the ACM SIGSOFT Software Engineering Notes, vol. 30, Issue 4, May 17, 2005, 5 Pages.

Song, et al., "Software Defect Association Mining and Defect Correction Effort Prediction", In Journal of IEEE Transactions on Software Engineering, vol. 32, Issue 2, Feb. 2006, pp. 69-82.

Spohrer, et al., "Where The Bugs Are", In Proceedings of the ACM SIGCHI Bulletin, vol. 16, Issue 4, Apr. 1985, pp. 47-53.

Tom, Copeland, "PMD Applied Shipping at Flank Speed", Retrieved from: https://mafiadoc.com/pmd-applied_59ce4de01723dd6ec1009122.html , Nov. 1, 2003, 1 Page.

Weibgerber, et al., "Identifying Refactorings from Source-Code Changes", In Proceedings of the 21st IEEE/ACM International Conference on Automated Software Engineering, Sep. 18, 2006, 11 Pages.

Wessel, et al., "Tweaking Association Rules to Optimize Software Change Recommendations", In Proceedings of 31st Brazilian Symposium on Software Engineering, Sep. 20, 2017, pp. 94-103.

Williams, et al., "Automatic Mining of Source Code Repositories to Improve Bug Finding Techniques", In Journal of IEEE Transactions on Software Engineering, vol. 31, Issue 6, Jun. 2005, pp. 466-480.

Ying, et al., "Predicting Source Code Changes by Mining Change History", In Journal of IEEE Transactions on Software Engineering, vol. 30, Issue 9, Sep. 2004, pp. 574-586.

Zimmerman, et al., "Mining Version Histories to Guide Software Changes", In Journal of IEEE Transactions on Software Engineering, vol. 31, Issue 6, Jun. 2005, pp. 1-10.

Zimmerman, et al., "Preprocessing CVS Data for Fine-Grained Analysis", In Proceedings of the First International Workshop on Mining Software Repositories, May 25, 2004, 5 Pages.

"APFEL: A Preprocessing Framework for Eclipse", Retrieved from: https://web.archive.org/web/20100510020433/http://www.st.cs.uni-saarland.de/softevo/apfel/, May 10, 2010, 2 Pages.

Zimmermann, et al., "Mining Version Archives for Co-changed Lines", In Proceedings of MSR, May 22, 2006, 4 Pages.

"Atlassian Marketplace", Retrieved from: https://marketplace.atlassian.com/search?q=recommend, Retrieved on: Oct. 3, 2016, 2 Pages.

"Final Office Action Issued in U.S. Appl. No. 12/471,006", dated Nov. 28, 2011, 24 Pages.

"Jlint—Find Bugs in Java Programs", Retrieved from: http://jlint.sourceforge.net/, Retrieved on: May 22, 2009, 1 Page.

"Koders-Source Code Search Engine", Retrieved from: http://www.koders.com/, Retrieved on: May 22, 2009, 2 Pages.

"Non-Final Office Action Issued in U.S. Appl. No. 12/471,006", dated Jun. 24, 2011, 23 Pages.

"Non-Final Office Action Issued in U.S. Appl. No. 12/471,006", dated Feb. 22, 2013, 10 Pages.

"Subversion", Retrieved from: http://subversion.tigris.org/, Retrieved on: May 22, 2009, 1 Page.

Agrawal, et al., "Fast Algorithms for Mining Association Rules", In Proceedings of the 20th VLDB Conference, Sep. 12, 1994, pp. 487-499.

Alpaydin, Ethem, "Introduction to Machine Learning", Retrieved from: https://books.google.co.in/books/about/Introduction_to_Machine_Learning_html?id=1k0_-WroiqEC&redir_esc=y, Oct. 2004, 1 Page.

Bevan, et al., "Facilitating Software Evolution Research with Kenyon", In Proceedings of ACM SIGSOFT software engineering notes, vol. 30, Issue 5, Sep. 5, 2005, 10 Pages.

Zimmermann, et al., "How History Justifies System Architecture (or not)", In Proceedings of the Sixth International Workshop on Principles of Software Evolution, Sep. 1, 2003, pp. 1-11.

Bevan, et al., "Identification of Software Instabilities", In Proceedings of the 10th Working Conference on Reverse Engineering, Nov. 13, 2003, 11 Pages.

Beyer, et al., "Clustering Software Artifacts Based on Frequent Common Changes", In Proceedings of the 13th International Workshop on Program Comprehension, May 15, 2005, 10 Pages.

Bouktif, et al., "Extracting Change-patterns from CVS Repositories", In Proceedings of the 13th Working Conference on Reverse Engineering, Oct. 2006, 10 Pages.

Brown, et al., "The State of Automated Configuration Management", In Annual Technical Review, Sep. 1991, 56 Pages.

Brun, et al., "Finding latent code errors via machine learning over program executions", In Proceedings of the 26th International Conference on Software Engineering, May 23, 2004, pp. 480-490.

Burch, et al., "Visual Data Mining in Software Archives", In Proceedings of the ACM symposium on Software visualization, May 14, 2005, pp. 37-46.

Cabrera, Luis, "Build types and model quality", Retrieved From https://web.archive.org/web/20160822183351/https://azure.microsoft.com/en-us/documentation/articles/cognitive-services-recommendations-buildtypes/, Aug. 22, 2016, 10 Pages.

Cabrera, Luis, "Collecting Data to Train your Model", Retrieved From https://web.archive.org/web/20160822191542/https://azure.microsoft.com/en-us/documentation/articles/cognitive-services-recommendations-collecting-data/, Aug. 22, 2016, 5 Pages.

Chen, et al., "CVSSearch: Searching through Source Code Using CVS Comments", In Proceedings of the IEEE International Conference on Software Maintenance, Nov. 7, 2001, 10 Pages.

Corbett, et al., "Bandera: Extracting Finite-state Models from Java Source Code", In Proceedings of the International Conference on Software Engineering, Jun. 9, 2000, pp. 439-448.

Cubranic, et al., "Hipikat: A Project Memory for Software Development", In Journal of IEEE Transactions on Software Engineering, vol. 31, Issue 6, Jun. 2005, pp. 446-465.

Cubranic, et al., "Hipikat: Recommending Pertinent Software Development Artifacts", In Proceedings of the 25th International Conference on Software Engineering, May 3, 2003, pp. 1-11.

D'Ambros, et al., "Fractal Figures: Visualizing Development Effort for CVS Entities", In Proceedings of the 3rd IEEE International Workshop on Visualizing Software for Understanding and Analysis, Sep. 2005, pp. 46-51.

(56) References Cited

OTHER PUBLICATIONS

Ernst, et al., "The Daikon system for dynamic detection of likely invariants", In Journal of Science of Computer Programming, vol. 69, Issue 1-3, Dec. 2007, pp. 35-45.
Fischer, et al., "Populating a Release History Database from Version Control and Bug Tracking Systems", In Proceedings International Conference on Software Maintenance, Sep. 22, 2003, pp. 1-10.
Flanagan, et al., "Extended Static Checking for Java", In Proceedings of the ACM SIGPLAN Conference on Programming Language Design and Implementation, Jun. 17, 2002, 12 Pages.
Gall, et al., "CVS Release History Data for Detecting Logical Couplings", In Proceedings of the Sixth International Workshop of Principles of Software Evolution, Sep. 1, 2003, 11 Pages.
Gall, et al., "Detection of Logical Coupling Based on Product Release History", In Proceedings of the International Conference on Software Maintenance, Nov. 16, 1998, pp. 1-10.
Godfrey, et al., "Using Origin Analysis to Detect Merging and Splitting of Source Code Entities", In Journal of IEEE Transactions on Software Engineering, vol. 31, Issue 2, Feb. 2005, pp. 166-181.
Graves, et al., "Predicting Fault Incidence Using Software Change History", In Journal of IEEE Transactions on Software Engineering, vol. 26, Issue 7, Jul. 2000, pp. 100-108.
Hassan, et al., "The Top Ten List: Dynamic Fault Prediction", In Proceedings of the 21st IEEE International Conference on Software Maintenance, Sep. 26, 2005, 10 Pages.
Holmes, et al., "Using Structural Context to Recommend Source Code Examples", In Proceedings of the 27th International Conference on Software Engineering, May 15, 2005, 9 Pages.
Hovemeyer, et al., "Finding Bugs is Easy", Retrieved from: http://baoz.net/wp-content/2009/02/finding-bugs-is-easy.pdf, Dec. 2004, 12 Pages.
Khoshgoftaar, et al., "Ordering Fault-Prone Software Modules", In Software Quality Journal, vol. 11, Issue 1, May 2003, pp. 19-37.
Khoshgoftaar, "Predicting the order of fault-prone modules in legacy software", In Proceedings of the Ninth International Symposium on Software Reliability Engineering, Nov. 4, 1998, 10 Pages.
Kim, et al., "Automatic Identification of Bug-Introducing Changes", In Proceedings of 21st IEEE/ACM International Conference on Automated Software Engineering, Sep. 18, 2006, 10 Pages.
Kim, et al., "When Functions Change Their Names: Automatic Detection of Origin Relationships", In Proceedings of 12th Working Conference on Reverse Engineering, Nov. 7, 2005, 10 Pages.
Ko, et al., "A framework and methodology for studying the causes of software erros in programming systems", In Journal of Visual Languages & Computing, vol. 16, Issue 1-2, Feb. 1, 2005, pp. 41-84.
Li, et al. "CP-Miner: Finding Copy-Paste and Related Bugs in Large-Scale Software Code", In Journal IEEE Transactions on software Engineering, vol. 32, Issue 3, Mar. 2006, pp. 176-192.
Livshits, et al., "DynaMine: Finding Common Error Patterns by Mining Software Revision Histories", In Proceedings of the ACM SIGSOFT Software Engineering Notes, vol. 30, Issue 5, Sep. 5, 2005, 10 Pages.
Mandelin, et al., "Jungloid Mining: Helping to Navigate the API Jungle", In Proceedings of the ACM Sigplan Notices, vol. 40, Issue 6, Jun. 12, 2005, 14 Pages.
Mockus, et al., "Identifying Reasons for Software Changes Using Historic Databases", In Proceeding of icsm, Oct. 11, 2000, pp. 120-130.
Mockus, et al., "Predicting Risk of Software Changes", In Journal of Bell Labs Technical Journal, vol. 5, Issue 2, Apr. 2000, pp. 169-180.
Moore, Andrew W, "Cross-Validation for Detecting and Preventing Overfitting", Retrieved from: http://www.autonlab.org/ tutorials/overfit10.pdf, 2001, 63 Pages.
Nagappan, et al., "Mining Metrics to Predict Component Failures", In Proceedings of the 28th international conference on Software engineering, May 28, 2006, 10 Pages.
Nagappan, et al., "Use of Relative Code Churn Measures to Predict System Defect Density", In Proceedings of the 27th international conference on Software engineering, May 15, 2005, 9 Pages.
Ostrand, et al., "Predicting the Location and Number of Faults in Large Software Systems", In Journal of IEEE Transactions on Software Engineering, vol. 31, Issue 4, Apr. 2005, pp. 340-355.
"International Search Report and Written Opinion Issued in PCT Application No. PCT/US2019/039635", dated Oct. 16, 2019, 12 Pages.
Rolfsnes, et al., "Predicting Relevance of Change Recommendations", In Proceedings of 32nd IEEE International Conference on Automated Software Engineering (ASE), Oct. 30, 2017, pp. 694-705.
Wang, et al., "Predicting Co-Changed Software Entities in the Context of Software Evolution", In Proceedings of International Conference on Information Engineering and Computer Science, Dec. 19, 2009, 5 Pages.

* cited by examiner

SOURCE CODE FILE RECOMMENDATION NOTIFICATION

BACKGROUND

When a user of a distributed version control system makes changes to source code files in a project database, those changes may affect source code files other than the files the user modified. The user may, in some instances, forget to make corresponding changes to each other source code file affected by the changes. For example, the user may change a file system location of a source code file in the project database but not change another source code file that refers to the file system location. When the user forgets to update the other files, errors may occur during compilation or runtime.

SUMMARY

According to one aspect of the present disclosure, a computing device is provided, including a non-volatile storage device and a processor configured to execute a distributed version control system stored in the non-volatile storage device. The processor may be configured to, via the distributed version control system, receive a pull request to apply a first set of one or more source code files to a project database. In response to receiving the pull request, the processor may be further configured to identify a second set of one or more source code files based at least in part on a recommendation ruleset including one or more association rules identified for a plurality of training pull requests applied to a training project database. The recommendation ruleset may be determined based at least in part on a respective last iteration of each training pull request. The processor may be further configured to output a source code file recommendation notification including an indication of each source code file of the second set of one or more source code files.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
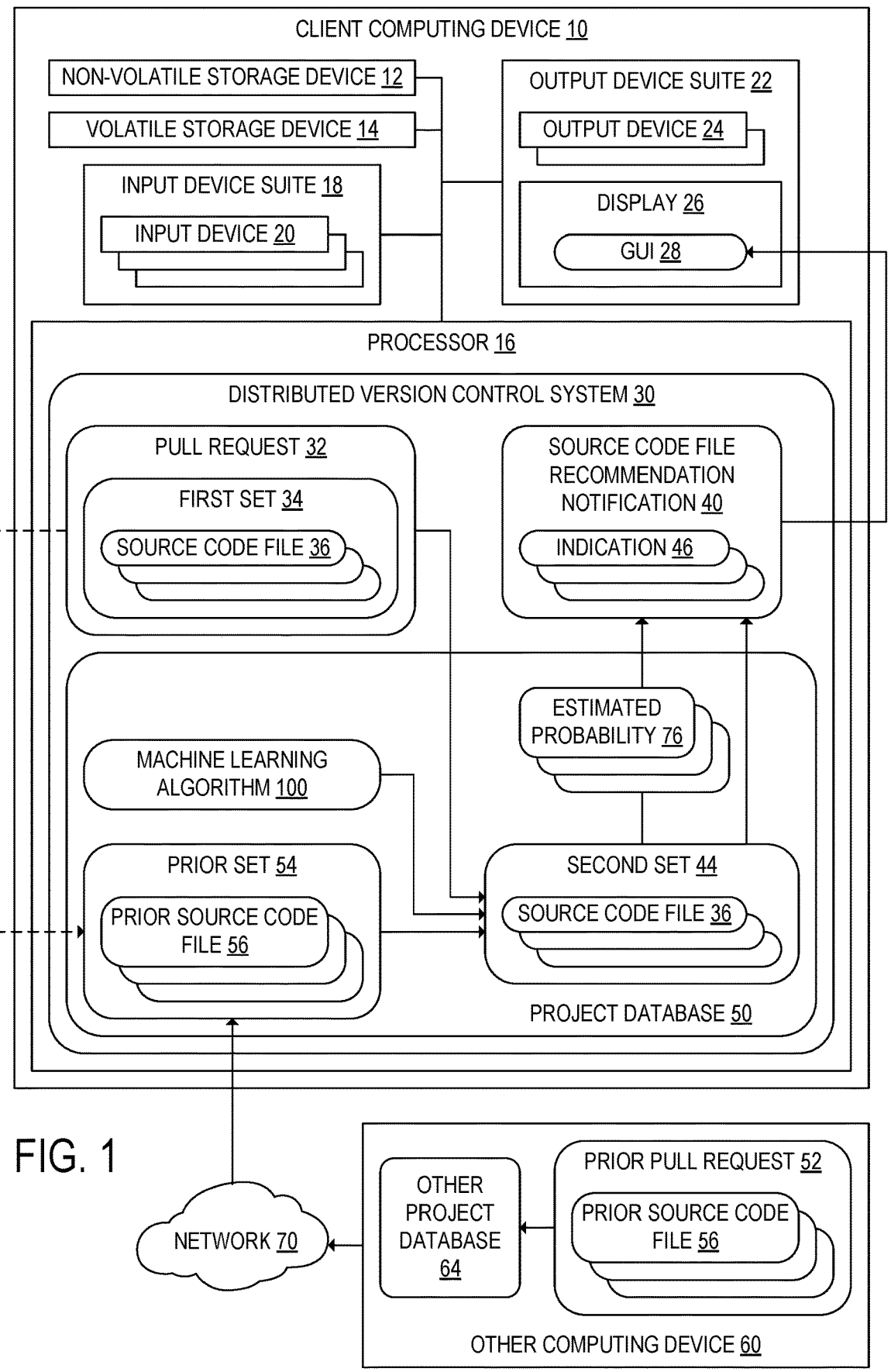
FIG. 1 shows a schematic view of an example computing device including a processor configured to execute a distributed version control system, according to one embodiment of the present disclosure.

In order to address the problems discussed above, a computing device 10 is provided. The computing device 10 may include a non-volatile storage device 12 and may further include a volatile storage device 14. The computing device 10 may further include a processor 16 configured to execute a distributed version control system 30 stored in the non-volatile storage device 12. The computing device 10 may further include an input device suite 18 including one or more input devices 20 operatively coupled to the processor 16. The one or more input devices 20 may include one or more of a touchscreen, a keyboard, a trackpad, a mouse, a button, a microphone, a camera, and/or an accelerometer. The computing device 10 may further include an output device suite 22, which may include one or more output devices 24 operatively coupled to the processor 16. The one or more output devices 24 may include a display 26 configured to display a graphical user interface (GUI) 28 of the distributed version control system 30. In some embodiments, the computing device 10 may include other output devices, such as one or more speakers or haptic feedback devices. Other types of input devices 20 and/or output devices 24 may be included in some embodiments of the computing device 10.

The computing device 10 may be configured to communicate with at least one other computing device 60 over a network 70. In some embodiments, the computing device 10 may be a server computing device that executes the distributed version control system 30 at least in part by communicating with one or more client computing devices over the network 70. Alternatively, the computing device 10 may be a client computing device that executes the distributed version control system at least in part by communicating with a server computing device and/or one or more other client computing device over the network 70. The features of the computing device 10 described herein may be implemented in a single computing device or distributed across a plurality of connected computing devices.

Via the distributed version control system 30, the processor 16 may be further configured to receive a pull request 32 to apply a first set 34 of one or more source code files 36 to a project database 50. A pull request is defined herein as a request to modify a project database 50 for which a user does not have write permissions. In response to a pull request 32, the one or more source code files 36 may be applied to the project database 50 following approval by another user. One or more source code files 36 may be added to the pull request 32, deleted from the pull request 32, and/or edited in one or more iterations prior to application of the one or more source code files 36 to the project database 50.

The project database 50 may be stored in the non-volatile storage device 12 of the computing device 10. Alternatively, the project database 50 may be stored at another computing device or distributed between a plurality of computing devices. In some embodiments, the distributed version control system 30 may include a plurality of project databases 50 stored at respective computing devices 10. As shown in the example of FIG. 1, the other computing device 60 stores another project database 64. In such embodiments, a project database 50 of the plurality of project databases 50 may be a master project database stored at a server computing device. A plurality of client computing devices may apply source code files 36 to the master project database.

In embodiments in which the computing device 10 is a server computing device, the pull request 32 may be received from a client computing device. In embodiments in which the computing device 10 is a client computing device, the pull request 32 may be received via the one or more input devices 20. Alternatively, the pull request 32 may be received from another client computing device.

In response to receiving the pull request 32, the processor 16 may be further configured to identify a second set 44 of one or more source code files 36. The one or more source code files 36 included in the second set 44 may be stored at the project database 50, as shown in FIG. 1. In embodiments in which the project database 50 is stored at another computing device, some or all of the one or more source code files 36 included in the second set 44 may instead be stored locally in the non-volatile storage device 12.

The processor 16 may identify the second set 44 of one or more source code files 36 based at least in part on one or more prior pull requests 52 applied to the project database 50. For example, the second set 44 may include one or more source code files 36 that were modified in the one or more prior pull requests 52. The one or more prior pull requests 52 may have been made at the computing device 10. Additionally or alternatively, the one or more prior pull requests 52 may include at least one prior pull request 52 received at the project database 50 from another computing device 60 via the network 70. In such embodiments, the one or more prior pull requests 52 may have been initially made at the other computing device 60, and may have modified another project database 64 stored at the other computing device 60. The one or more prior pull requests 52 may each include one or more prior source code files 56, which may be stored in the project database 50.

Figure 2:
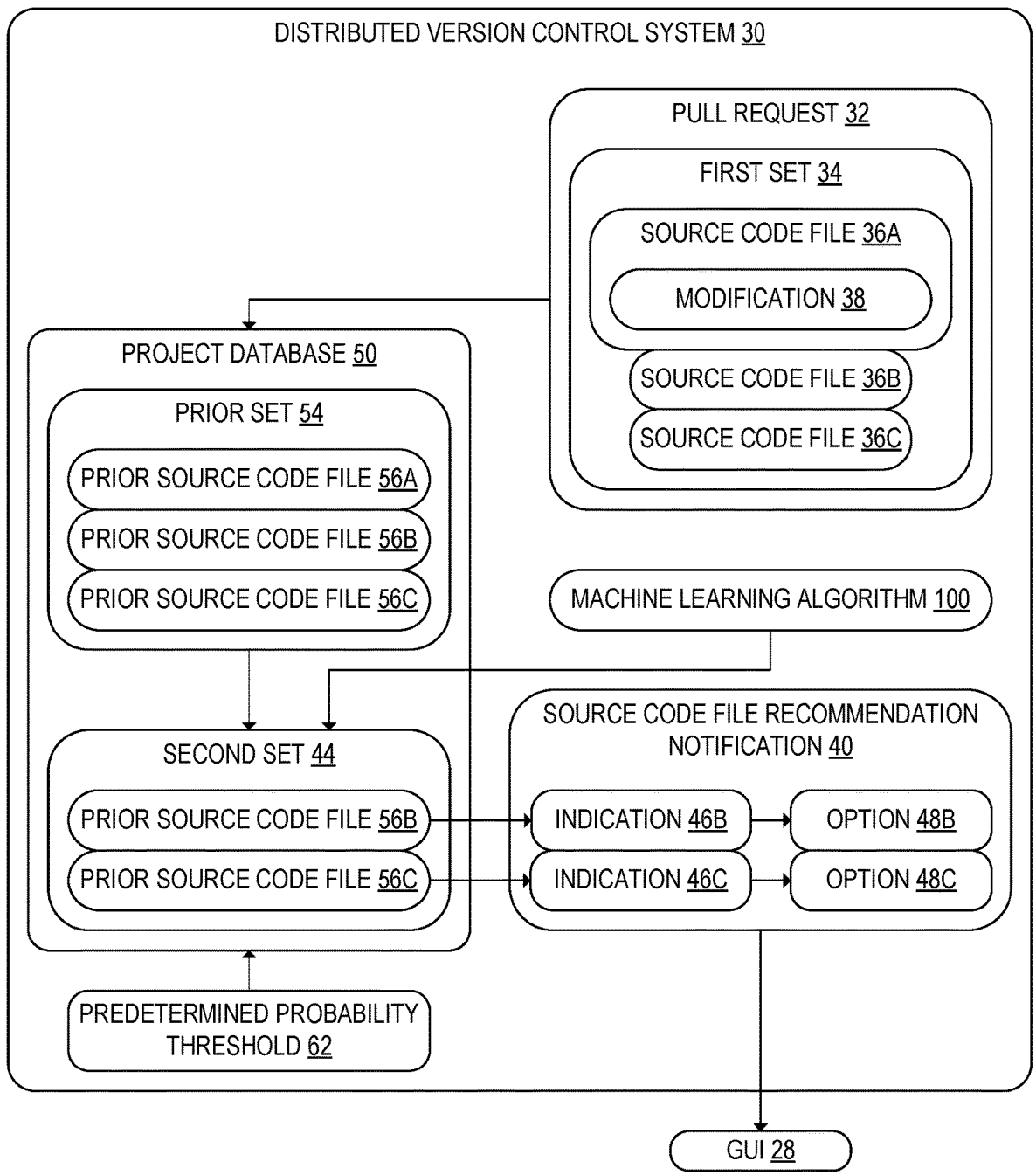
FIG. 2 shows a schematic view of an example distributed version control system, according to the embodiment of FIG. 1.

In some embodiments, the first set 34 of one or more source code files 36 may include a modification to one or more prior source code files 56 applied in response to the one or more prior pull requests 52. An example schematic depiction of the distributed version control system 30 in such an embodiment is shown in FIG. 2. In the embodiment of FIG. 2, the first set 34 of one or more source code files 36 included in the pull request 32 includes a first source code file 36A, a second source code file 36B, and a third source code file 36C. The first source code file 36A includes a modification 38 to first prior source code file 56A included in a prior set 54 of prior source code files 56. The second source code file 36B and the third source code file 36C may, for example, be newly added source code files that do not include modifications to prior source code files.

In the example embodiment of FIG. 2, the prior set 54 further includes a second prior source code file 56B and a third prior source code file 56C that are not modified by the first source code file 36A. The source code files 36 included in the second set 44 of one or more source code files 36 may be prior source code files 56 included in the prior set 54. In the example of FIG. 2, the second set 44 includes the second prior source code file 56B and the third prior source code file 56C.

The second set 44 of one or more source code files 36 may be identified based on properties of the one or more source code files 36 included in the first set 34 and/or the second set 44, as discussed in the examples provided below. The processor 16 may determine relevant properties using a machine learning algorithm 100, as discussed below with reference to FIG. 5.

Figure 3:
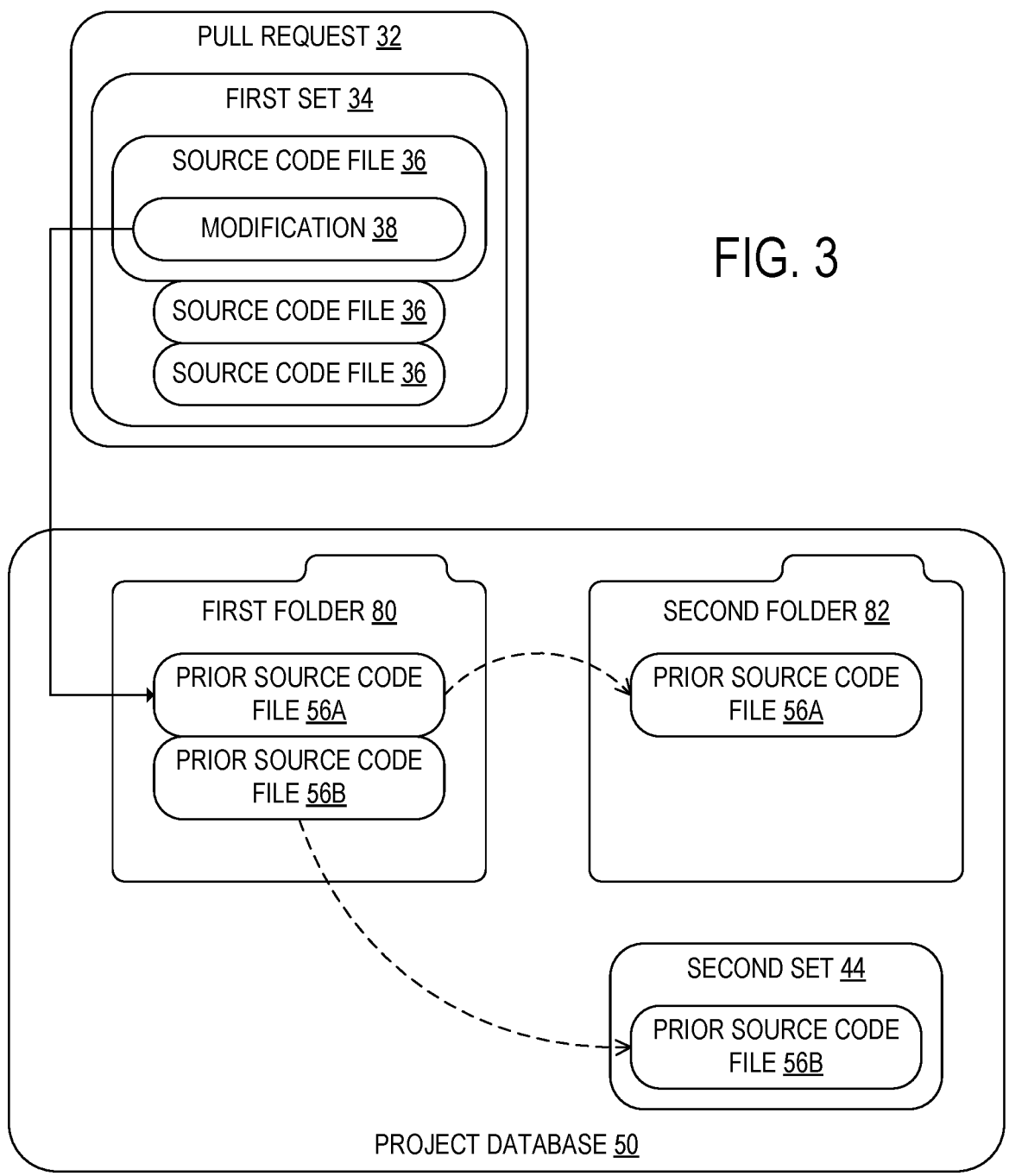
FIG. 3 shows an example depiction of a modification to a project database, according to the embodiment of FIG. 1.

In some embodiments, the second set 44 of one or more source code files 36 may be identified based at least in part on one or more respective file system locations of the first set 34 of one or more source code files 36. For example, as shown in FIG. 3, the processor 16 may determine that a modification 38 made by a source code file 36 included in the pull request 32 modifies a file structure of the project database 50 by moving a prior source code file 56A from a first folder 80 into a second folder 82. In response to determining that the modification 38 modifies the file structure in this way, the processor 16 may add one or more other prior source code files 56 included in the first folder 80 to the second set 44 of one or more source code files 36. In the embodiment of FIG. 3, the processor 16 adds a second prior source code file 56B included in the first folder 80 to the second set 44 of one or more source code files 36.

Returning to FIG. 1, after the second set 44 of one or more source code files 36 has been identified, the processor 16 may be further configured to output a source code file recommendation notification 40 including an indication 46 of each source code file 36 of the second set 44 of one or more source code files 36. Thus, the user may be notified of one or more source code files 36 that may be desirable to add to the pull request 32 or apply in a subsequent pull request.

Figure 4:
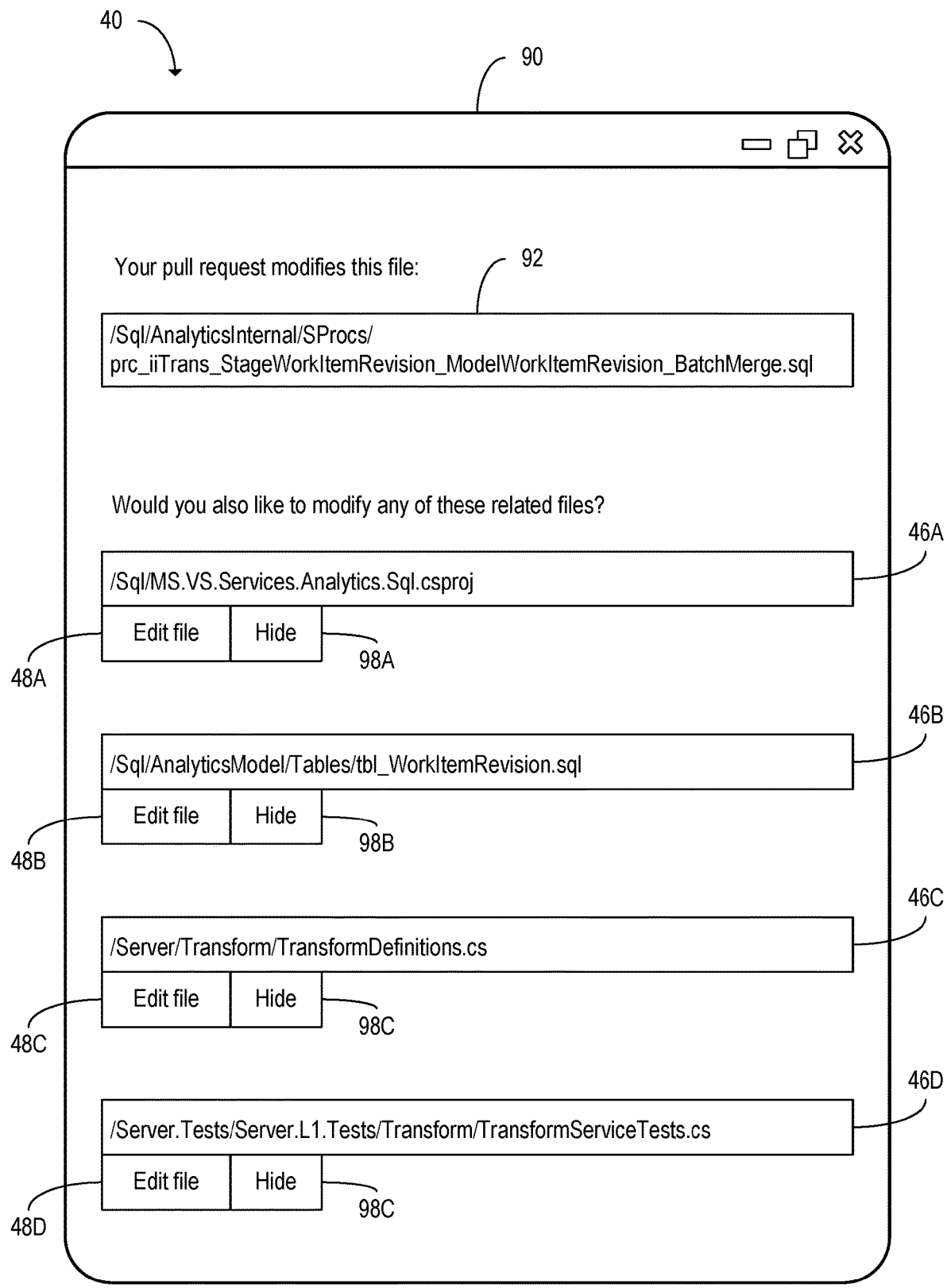
FIG. 4 shows an example source code file recommendation notification, according to the embodiment of FIG. 1.

In embodiments in which the processor 16 is further configured to output a GUI 28 of the distributed version control system 30 for display on the display 26, the processor 16 may be further configured to display the source code file recommendation notification 40 in the GUI 28. FIG. 4 shows an example source code file recommendation notification 40 that may be displayed in the GUI 28 of the distributed version control system 30. In the example of FIG. 4, the source code file recommendation notification 40 is displayed within a window 90. The window 90 includes a respective indication 46 for each source code file 36 included in the second set 44. The example window 90 of FIG. 4 includes a first indication 46A, a second indication 46B, a third indication 46C, and a fourth indication 46D. In embodiments in which the pull request 32 includes a modification 38 to one or more prior source code files 56, the window 90 may include a modified file indication 92 that shows the one or more prior source code files 56 that are modified.

Returning to FIG. 2, the source code file recommendation notification 40 may include, for each source code file 36 of the second set 44 of one or more source code files 36, a respective option 48 to modify that source code file 36. As shown in FIG. 2, the source code file recommendation notification 40 includes respective options 48B and 48C to modify the second prior source code file 56B and the third prior source code file 56C respectively. In embodiments in which the first set 34 of one or more source code files 36 includes a modification 38 to one or more prior source code files 56 applied in response to one or more prior pull requests 52, the respective options 48 to modify each source code file 36 of the second set 44 may include one or more respective options 48 to modify the one or more additional prior source code files 56 included in the second set 44 but not modified by the one or more source code files 36 included in the first set 34. In response to selection of the option 48 to modify the at least one source code file 36, the at least one source code file 36 may be displayed in the GUI 28 such that the user may edit the at least one source code file 36. Thus, the distributed version control system 30 may remind the user of changes that must be made to the one or more source code files 36 in order to avoid errors during compilation or runtime.

Returning to FIG. 4, the one or more respective options 48 to modify the one or more source code files 36 may be displayed in the source code file recommendation notification 40 as one or more interactable GUI elements. The window 90 of FIG. 4 includes a first option 48A, a second option 48B, a third option 48C, and a fourth option 48D associated with each of the first indication 46A, the second indication 46B, the third indication 46C, and the fourth indication 46D. Each of the first option 48A, the second option 48B, the third option 48C, and the fourth option 48D is indicated by a respective interactable GUI element labeled "Edit file." In response to selection of such a GUI element, the processor 16 may open the associated source code file 36 in the GUI 28 of the distributed version control system 30. The source code file 36 may be displayed in the window 90 or may alternatively be displayed in another window or area of the GUI 28. In the example of FIG. 4, each of the indications 46A, 46B, 46C, and 46D also have respective "Hide" GUI elements 98A, 98B, 98C, and 98D. In response to the user selecting the "Hide" GUI element associated with an indication 46, the processor 16 may remove that indication 46 from the window 90.

Returning to FIG. 1, the processor 16 may, in some embodiments, rank the one or more indications 46 included in the source code file recommendation notification 40 by estimated relevance. For each source code file 36 of the second set 44 of one or more source code files 36, the processor 16 may be further configured to determine an estimated probability 76 that a modification 38 to the source code file 36 will be added to the pull request 32. The estimated probability 76 that each source code file 36 in the second set 44 will be added to the pull request 32 may be determined by the machine learning algorithm 100. In embodiments in which the processor 16 is configured to determine the one or more estimated probabilities 76, the second set 44 of one or more source code files 36 may be ranked in the source code file recommendation notification 40 based on the respective estimated probabilities 76 of each source code file 36 being added to the pull request 32. The one or more source code files 36 may be ranked in ascending or descending order.

Additional examples of properties that may be identified in the first set 34 of one or more source code files 36 and used to determine the second set 44 of one or more source code files 36 are now provided. As discussed above, the processor 16 may be configured to determine the second set 44 based at least in part on one or more respective file system locations of the one or more source code files 36 included in the first set 34. In such embodiments, the processor 16 may further identify the second set 44 of one or more source code files 36 based on one or more respective file system locations of the one or more source code files 36 included in the second set 44. For example, the processor 16 may include in the second set 44 one or more source code files 36 located in the same folder as a source code file 36 in the first set 34.

Additionally or alternatively, the processor 16 may be configured to determine the second set 44 of one or more source code files 36 based at least in part on one or more tokens included in one or more file names. The one or more tokens may be substrings of the one or more file names. For example, when a user edits a file named "StringComparer.cs," the user may be likely to also modify a file named "StringComparerTests.cs." The processor 16 may identify that both files include the token "StringComparer," and may therefore add "StringComparerTests.cs" to the second set 44. In some embodiments, the one or more tokens may be identified using one or more regular expressions.

The processor 16 may additionally or alternatively be configured to determine the second set 44 of one or more source code files 36 based at least in part on file type of at least one source code file 36 included in the first set 34. For example, the processor 16 may determine based on a first file type of the one or more source code files 36 included in the first set 34 that the one or more source code files 36 of the first set 34 are written in a first programming language. Based on this determination, the processor may determine that a source code file 36 also written in the first programming language has a higher probability of being relevant to the user, and/or that a source code file 36 written in a second programming language has a lower probability of relevance. In some embodiments, the processor 16 may be configured to examine syntactic features of the one or more source code files 36 of the first set 34 in order to determine respective programming languages of those source code files 36 even when the programming language is not specified in the respective file types. Additionally or alternatively, the processor 16 may be configured to determine the second set 44 based at least in part on one or more respective file extensions of the one or more source code files. For example, the processor 16 may determine that documentation files with the ".html" extension and documentation files with the ".png" extension are frequently edited together, and may therefore be more likely to add a source code file 36 with the ".png" extension to the second set 44 when a source code file 36 with the ".html" extension is edited.

Figure 5:
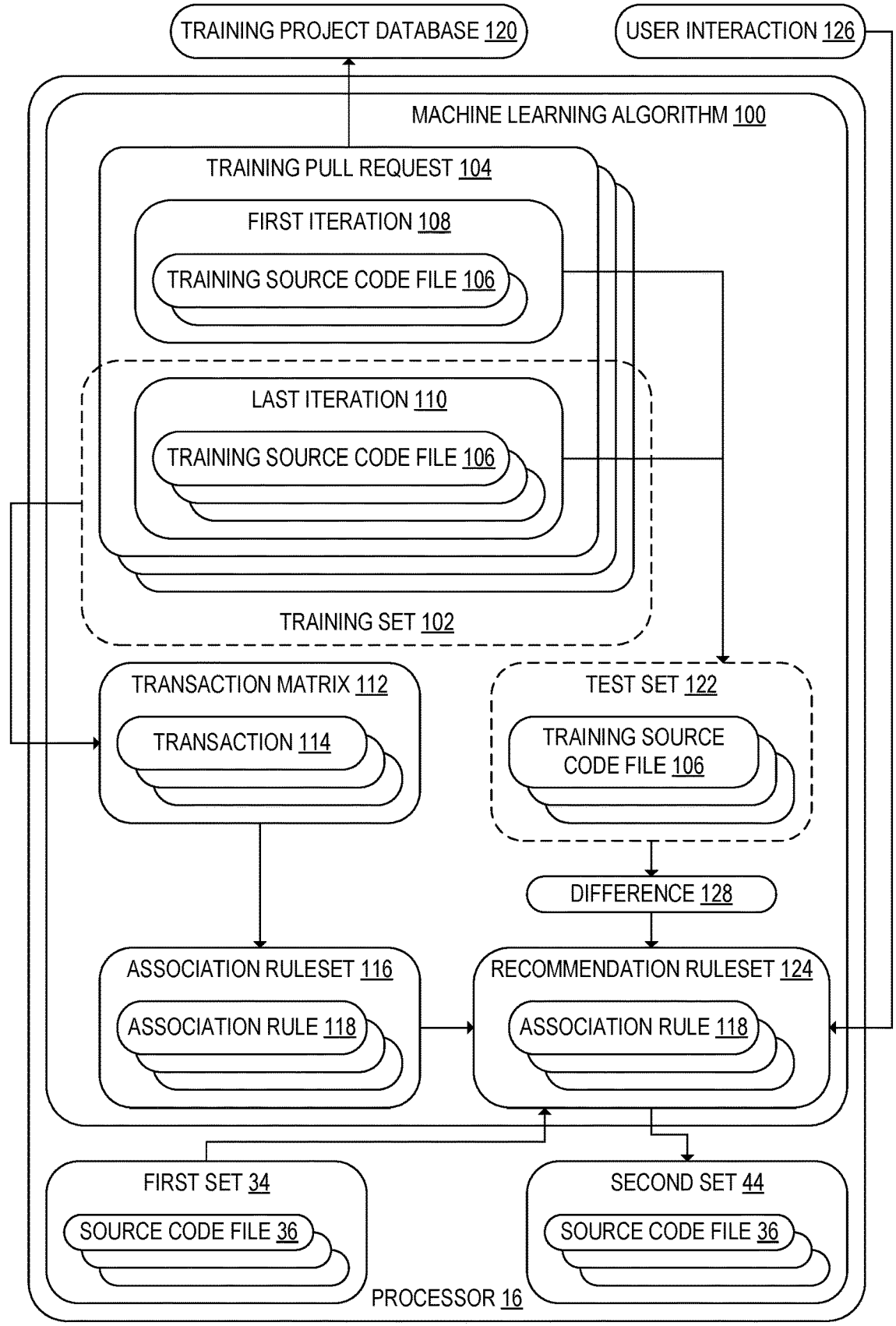
FIG. 5 shows an example machine learning algorithm, according to the embodiment of FIG. 1.

In some embodiments, the processor 16 may determine the second set 44 at least in part by applying a machine learning algorithm. An example machine learning algorithm 100 is shown in FIG. 5. In the embodiment of FIG. 5, the processor 16 is configured to train the machine learning algorithm 100 based on a plurality of training pull requests 104. The plurality of training pull requests 104 may be requests to modify a training project database 120. The training project database 120 may be different from the project database 50 of FIG. 1. Thus, the machine learning algorithm 100 may be applicable to projects other than the project on which it is trained. In some embodiments, the plurality of training pull requests 104 may be requests to modify a plurality of training project databases 120. In such embodiments, training pull requests 104 from a plurality of projects may be used to train the machine learning algorithm 100.

Each training pull request 104 includes a first iteration 108 including one or more training source code files 106. The first iteration 108 is a set of one or more training source code files 106 that are included in the training pull request 104 when the training pull request is initially made. Each training pull request 104 also includes a last iteration 110 including one or more training source code files 106 that are included in the training pull request 104 when the training pull request is applied to the training project database 120. Some training pull requests 104 may include only a single iteration. In such training pull requests 104, the first iteration 108 is the last iteration 110. In some embodiments, one or more of the training pull requests 104 may include one or more intermediate iterations between the first iteration 108 and the last iteration 110.

The processor 16 may be further configured to determine a training set 102 and a test set 122 based on the plurality of training pull requests 104. The training set 102 and the test set 122 may each include a plurality of iterations included in the plurality of training pull requests 104. In the example of FIG. 5, the training set 102 includes each of the last iterations 110 of the training pull requests 104. The test set 122 includes each of the first iterations 108 and each of the last iterations 110. In other embodiments, the training set 102 and/or the test set 122 may include one or more intermediate iterations.

In the example of FIG. 5, the machine learning algorithm 100 is trained by applying the Apriori algorithm to each of the last iterations 110 included in the plurality of training pull requests 104. When the processor 16 applies the Apriori algorithm to the plurality of last iterations 110 included in the training set 102, the processor 16 may generate a transaction matrix 112 in which the respective set of training source code files 106 included in each last iteration 110 defines a transaction 114. The transaction matrix 112 may indicate, for each transaction 114, whether that transaction 114 includes a modification to each training source code file 106 included in the training project database 120.

Figure 6:
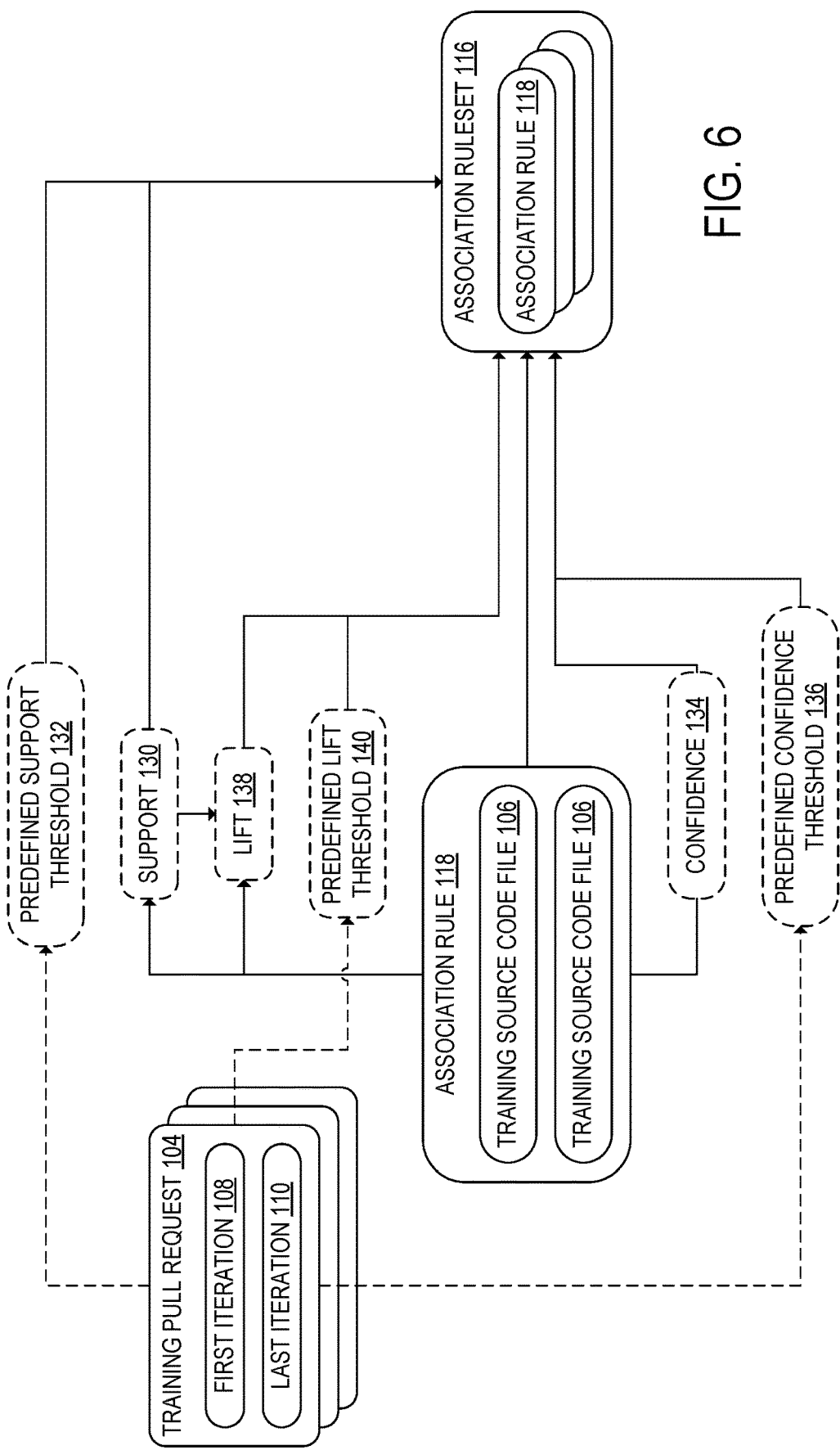
FIG. 6 shows an example determination of an association ruleset, according to the embodiment of FIG. 1.

Based on the transaction matrix 112, the processor 16 is further configured to determine an association ruleset 116 including one or more association rules 118. Determination of the association ruleset 116 is shown in further detail with reference to FIG. 6. As shown in FIG. 6, each association rule 118 indicates two or more training source code files 106. The association ruleset 116 includes one or more association rules 118 for which the two or more training source code files 106 are frequently modified together in the same training pull request 104.

In one example, to determine whether two or more training source code files 106 are frequently modified together, the processor 16 may determine that the association rule 118 for that set of two or more training source code files 106 has support 130 greater than a predefined support threshold 132. The support 130 of an association rule 118 is defined as the number of transactions 114 in which the two or more training source code files 106 indicated in the association rule 118 are modified together divided by the total number of transactions 114.

The processor 16 may additionally or alternatively determine a confidence 134 for each training source code file 106 included in an association rule 118. The confidence 134 of a training source code file 106 included in an association rule 118 is defined as a ratio of the number of transactions 114 including the training source code file 106 to the number of transactions 114 for which the association rule 118 holds. In some embodiments, the processor 16 may determine that two or more training source code files 106 are frequently modified together if the confidence 134 of an association rule 118 for those training source code files 106 exceeds a predefined confidence threshold 136. Thus, one or more association rules 118 with confidence 134 exceeding the predefined confidence threshold 136 may be included in the association ruleset 116.

Additionally or alternatively, the processor 16 may determine a lift 138 of an association rule 118. The lift 138 of an association rule 18 is defined as the support 130 for the association rule 118 divided by the product of the support 130 of each training source code file 106 included in the association rule 118. The support 130 of a single training source code file 106 is defined as the number of transactions 114 including that training source code file 106 divided by the total number of transactions 114. In some embodiments, the processor 16 may determine that an association rule 118 has a lift 138 exceeding a predefined lift threshold 140 and may include the association rule 118 in the association ruleset 116 based on this determination.

In some embodiments, one or more of the predefined support threshold 132, the predefined confidence threshold 136, and the predefined lift threshold 140 may be set based at least in part on an estimated probability that a training source code file 106 recommended by an association rule 118 is added to a training pull request 104 between the first iteration 108 and the last iteration 110. This estimated probability may be determined based at least in part by comparing the plurality of first iterations 108 to the plurality of second iterations 110. The processor 16 may be further configured to select the predefined support threshold 132, the predefined confidence threshold 136, and/or the predefined lift threshold 140 to include one or more association rules 118 that exceed a predefined estimated probability.

In some embodiments, an association rule quality metric other than support 130, confidence 134, and lift 138 may be used.

In some embodiments, the processor 16 may determine the one or more association rules 18 for a maximum number of training source code files 106 per rule. For example, the processor 16 may be configured to determine one or more association rules 118 that each indicate two or three training source code files 106. Additionally or alternatively, the processor 16 may only determine association rules 118 for training source code files 106 that occur in more than a threshold number of training pull requests 104. For example, the processor 16 may determine one or more association rules 118 only for training source code files 106 that are modified five or more times in the plurality of training pull requests 104 included in the training set 102.

Returning to FIG. 5, the processor 16 may determine a test set 122 including each first iteration 108 and each last iteration 110 of the plurality of training pull requests 104, as discussed above. The processor 16 may be further configured to determine a difference 128 between a set of the first iterations 108 and the last iterations 110 to identify, for each training pull request 104, any training source code files 106 that were added to the training pull request 104 following the first iteration 108. Such training source code files 106 may be training source code files 106 that were initially forgotten by a user when a training pull request 104 was generated.

Based on the association ruleset 116 and the difference 128, the processor 16 may be further configured to determine a recommendation ruleset 124 including one or more of the association rules 118 included in the association ruleset 116. The recommendation ruleset 124 may include association rules 118 for one or more training source code files 106 that are frequently included in the last iterations 110 of training pull requests 104 but not in the first iterations 108. In other embodiments, the processor 16 may be configured to determine the recommendation ruleset 124 based on the one or more association rules 118 and the one or more last iterations 110 without determining a difference 128 between the one or more first iterations 108 and the one or more last iterations 110.

In some embodiments, the recommendation ruleset 124 may also be determined based at least in part on one or more user interactions 126 with the one or more training source code files 106. For example, a user may train the machine learning algorithm 100 at least in part by providing input that indicates whether one or more training source code files 106 recommended by the one or more association rules 118 are relevant. Based on the one or more user interactions 126, the machine learning algorithm 100 may increase or decrease a probability of applying an association rule 118 included in the recommendation ruleset 124.

At runtime, the second set 44 of one or more source code files 36 may be determined by applying the one or more association rules 118 included in the recommendation ruleset 124 to the first set 34 of one or more source code files 36.

Figure 7:
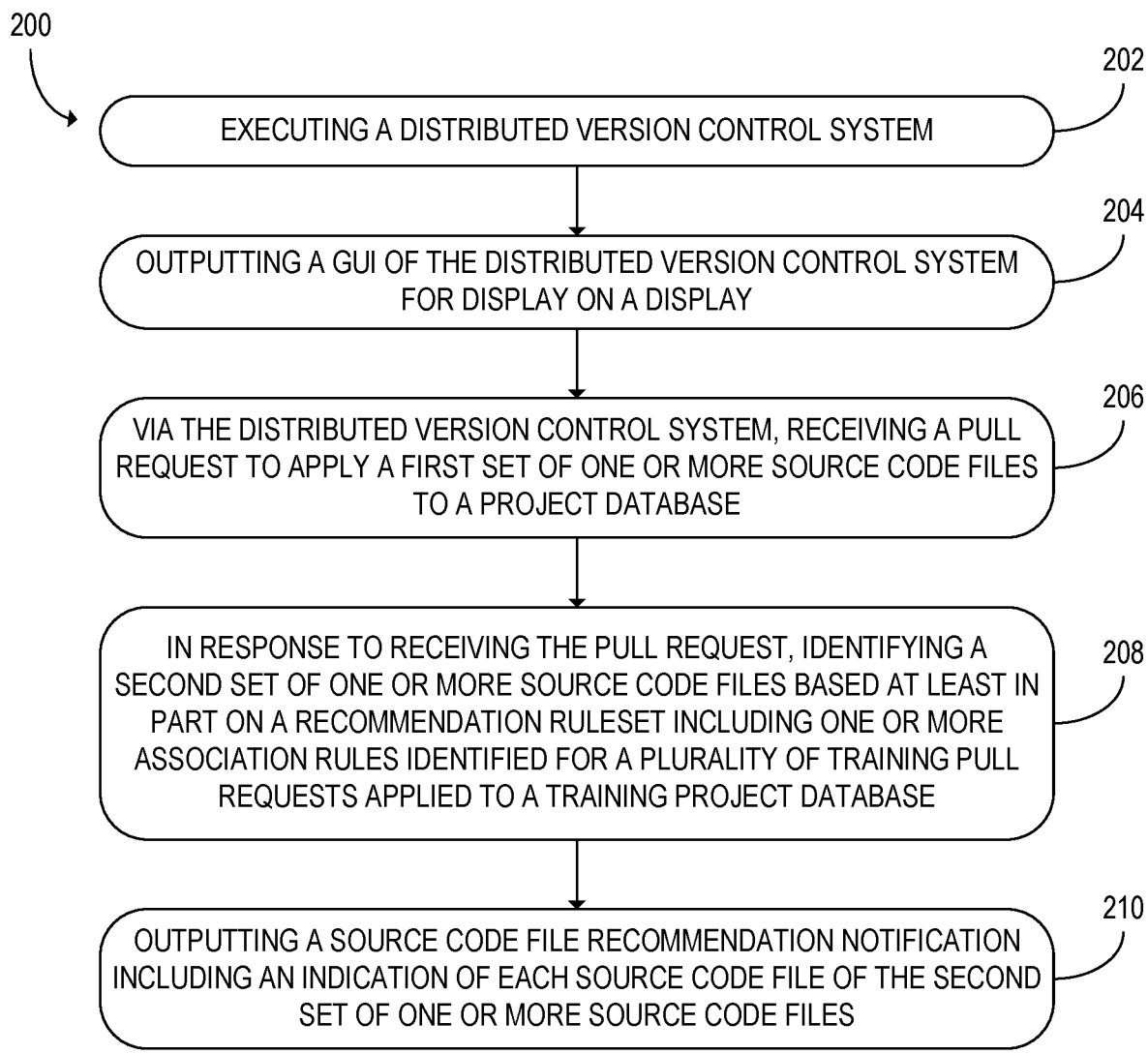
FIG. 7 shows a flowchart of an example method that may be performed by the computing device of FIG. 1.

FIG. 7 shows a flowchart of an example method 200 that may be performed at a processor of a computing device. The computing device at which the method 200 is performed may be the computing device 10 of FIG. 1, or alternatively may be some other computing device. At step 202, the method 200 may include executing a distributed version control system. In some embodiments, the method 200 may further include, at step 204, outputting for display on the display a graphical user interface (GUI) of the distributed version control system for display on a display. The display may be included in the computing device at which the method is performed, or alternatively may be included in another computing device communicatively coupled to the computing device.

At step 206, the method 200 may further include, via the distributed version control system, receiving a pull request to apply a first set of one or more source code files to a project database. The project database may be stored at the computing device, at another computing device, or distributed over a plurality of computing devices. The first set of one or more source code files may include a modification to one or more prior source code files applied in response to the one or more prior pull requests.

At step 208, the method 200 may further include, in response to receiving the pull request, identifying a second set of one or more source code files based at least in part on a recommendation ruleset including one or more association rules identified for a plurality of training pull requests applied to a training project database.

Figure 8:
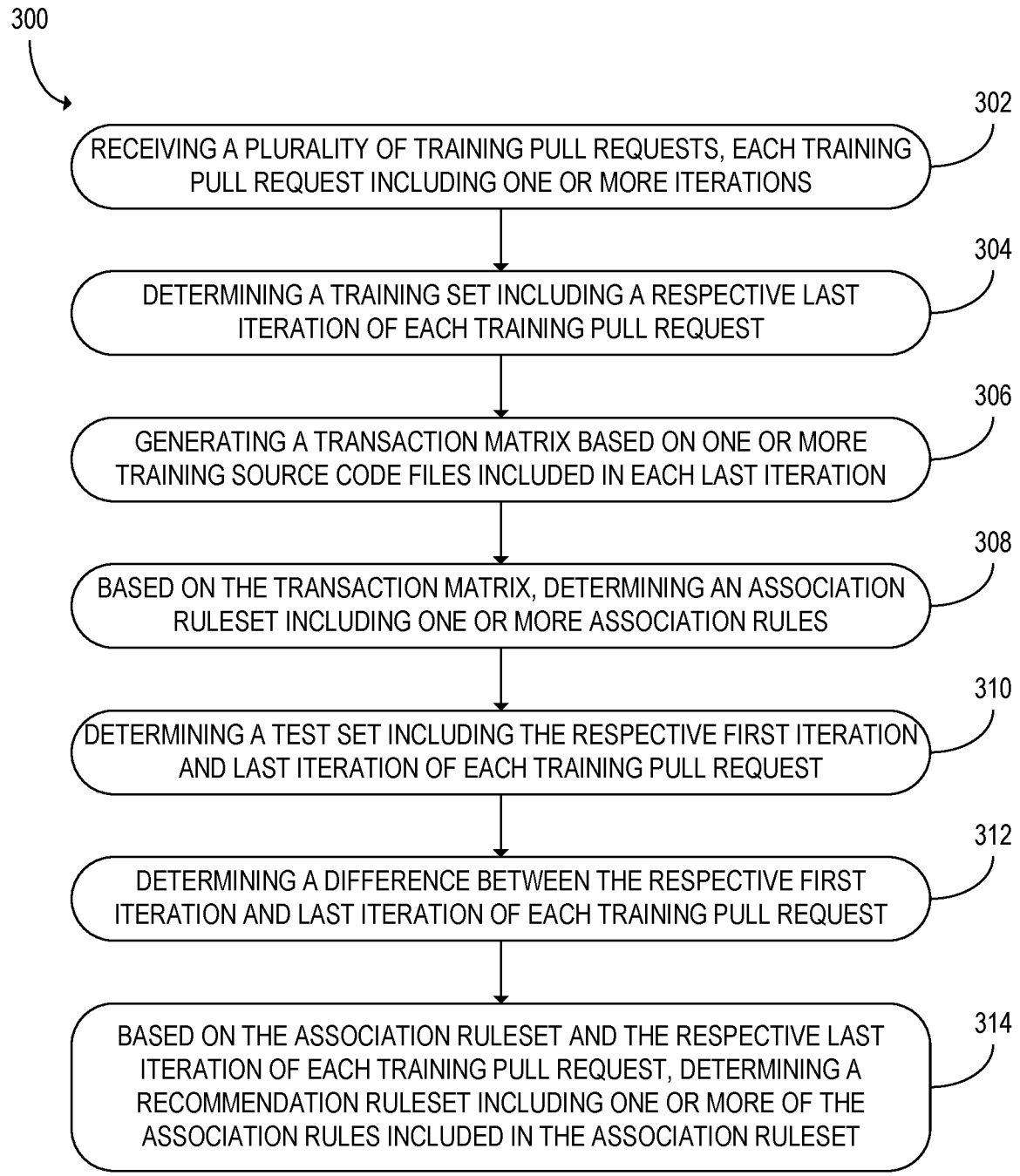
FIG. 8 shows a flowchart of an example method of training a machine learning algorithm, according to the embodiment of FIG. 7.

Turning to FIG. 8, a flowchart of an example method 300 for determining the recommendation ruleset is shown. In the example of FIG. 8, method 300 is a method for training a machine learning algorithm that may be performed prior to performing the method 200 of FIG. 7. The method 300 may include, at step 302, receiving a plurality of training pull requests, each training pull request including one or more iterations. Each iteration may include one or more training source code files. The one or more training pull requests may, in some embodiments, be pull requests to a training project database that may be different from the project database of step 206.

At step 304, the method 300 may further include determining a training set including a respective last iteration of each training pull request. In the example of FIG. 8, the Apriori algorithm is used to generate one or more association rules for the one or more training source code files included in the training set. At step 306, the method 300 may further include generating a transaction matrix based on the one or more training source code files included in each last iteration. Each set of one or more training source code files included in a respective last iteration may be represented as a transaction in the transaction matrix. At step 308, the method 300 may further include, based on the transaction matrix, determining an association ruleset including one or more association rules. Although the Apriori algorithm is used to generate the association ruleset in the example of FIG. 8, other algorithms may be used in other embodiments.

In some embodiments, determining the association ruleset may include determining at least one of a support, a confidence, and a lift for the one or more association rules. In such embodiments, an association rule may be included in the association ruleset based at least in part on a determination that the association rule exceeds a predefined support threshold, confidence threshold, and/or lift threshold.

At step 310, the method 300 may further include determining a test set including the respective first iteration and last iteration of each training pull request. For training pull requests that include only one iteration, the first iteration is the last iteration. However, in training pull requests that include two or more iterations, one or more training source code files may be added to the training pull request in one or more iterations following the first iteration. The one or more added training source code files may be files that a user initially forgot to add to the pull request. Thus, it may be desirable to train the machine learning algorithm to recommend source code files similar to the added training source code files. In order to determine the one or more added training source code files, the method 300 may further include, at step 312, determining a difference between the respective first iteration and last iteration of each training pull request.

At step 314, the method 300 may further include, based on the association ruleset and the respective last iteration of each training pull request, determining a recommendation ruleset including one or more of the association rules in the association ruleset. In embodiments in which step 312 is performed, the recommendation ruleset may be determined based at least in part on the difference between the respective first iteration and last iteration of each training pull request. In some embodiments, the determination of the recommendation ruleset may be further based on one or more user interactions with the machine learning algorithm.

The one or more association rules included in the recommendation ruleset may be based on various properties of the one or more training source code files included in the training set. At runtime, the machine learning algorithm may check for those properties in the first set of one or more source code files to determine the second set of one or more source code files. In some embodiments, the second set of one or more source code files may be identified based at least in part on one or more respective file system locations of the first set of one or more source code files. Additionally or alternatively, the second set of one or more source code files may be identified based at least in part on one or more substrings included in respective file names of the first set of one or more source code files. The one or more substrings included in the respective file names may be identified, and/or the one or more substrings may be matched to the second set of one or more source code files, at least in part by applying one or more regular expressions to the respective file names of one or more source code files. Additionally or alternatively, the second set of one or more source code files may be identified based at least in part on respective file extensions of the first set of one or more source code files.

Returning to FIG. 7, at step 210, the method 200 may further include outputting a source code file recommendation notification including an indication of each source code file of the second set of one or more source code files. In embodiments in which a GUI of the distributed version control system is output for display on a display, the source code file recommendation notification may be included in the GUI. For example, a window that shows the source code file recommendation notification may be output for display.

Figure 9:
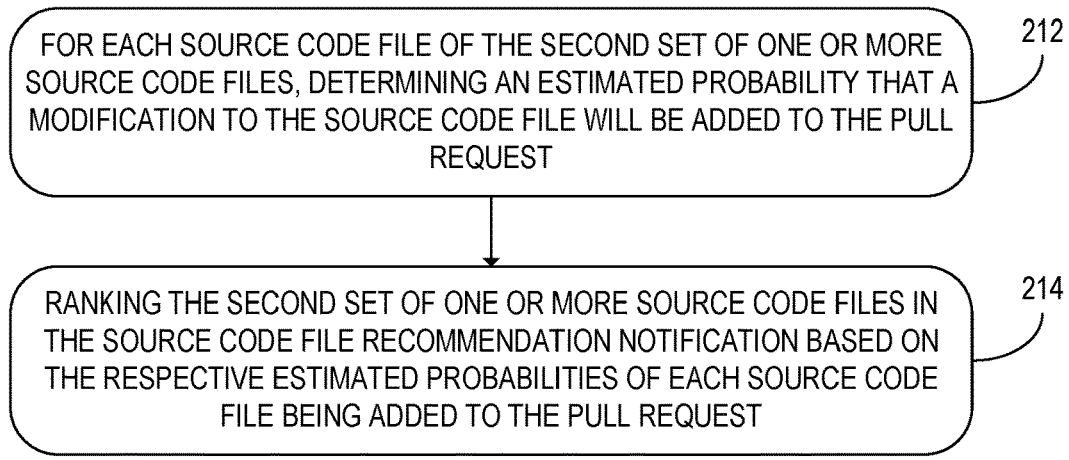
FIG. 9 shows additional steps that may be performed in some embodiments when performing the method of FIG. 7.

Additional steps that may be included in the method 200 in some embodiments are shown in FIG. 9. FIG. 9 shows additional steps that may be performed in some embodiments to determine a layout of the source code file recommendation notification. At step 212, the method 200 may include, for each source code file of the second set of one or more source code files, determining an estimated probability that a modification to the source code file will be added to the pull request in a subsequent iteration. The estimated probability may be determined, for example, based at least in part on user feedback provided via interaction with at least one prior source code file recommendation notification. At step 214, the method 200 may further include ranking the second set of one or more source code files in the source code file recommendation notification based on the respective estimated probabilities of each source code file being added to the pull request. The one or more source code files indicated in the source code file recommendation notification may be ranked in ascending or descending order of estimated probability of being added to the pull request.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
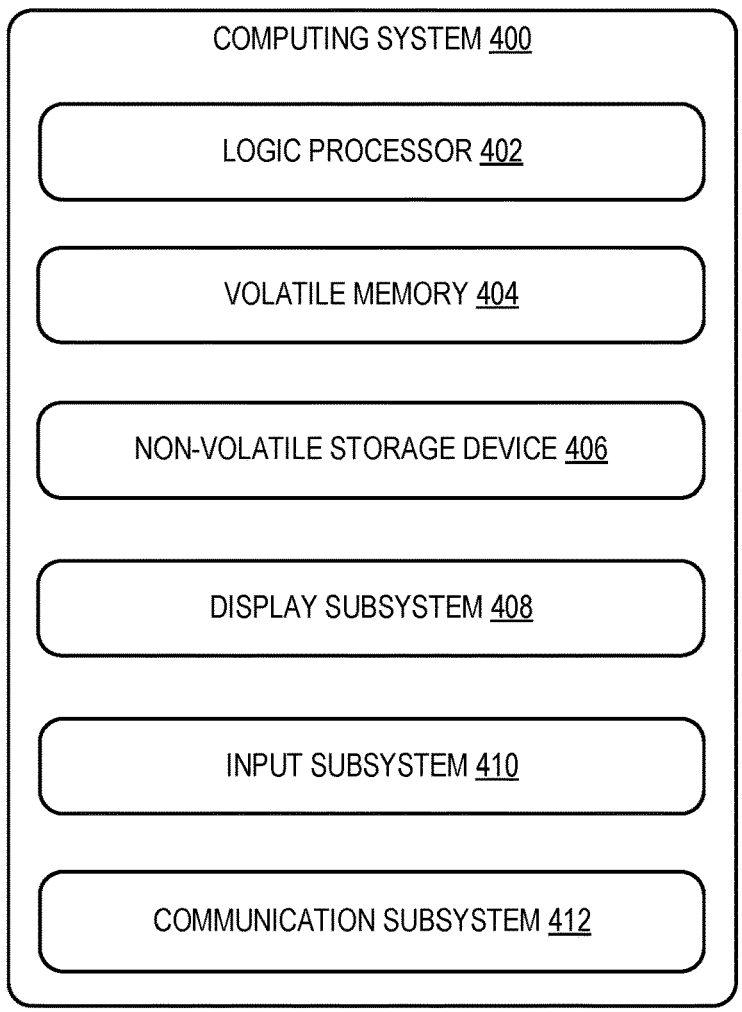
FIG. 10 shows a schematic view of an example computing environment in which the computing device of FIG. 8 may be enacted.

FIG. 10 schematically shows a non-limiting embodiment of a computing system 400 that can enact one or more of the methods and processes described above. Computing system 400 is shown in simplified form. Computing system 400 may embody the computing device 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 10.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a computing device is provided, including a non-volatile storage device and a processor. The processor may be configured to execute a distributed version control system stored in the non-volatile storage device. The processor may be further configured to receive a pull request to apply a first set of one or more source code files to a project database via the distributed version control system. In response to receiving the pull request, the processor may be further configured to identify a second set of one or more source code files based at least in part on a recommendation ruleset including one or more association rules identified for a plurality of training pull requests applied to a training project database. The recommendation ruleset may be determined based at least in part on a respective last iteration of each training pull request. The processor may be further configured to output a source code file recommendation notification including an indication of each source code file of the second set of one or more source code files.

According to this aspect, each association rule included in the recommendation ruleset may have a support exceeding a predefined support threshold.

According to this aspect, each association rule included in the recommendation ruleset may have a confidence exceeding a predefined confidence threshold.

According to this aspect, each association rule included in the recommendation ruleset may have a lift exceeding a predefined lift threshold.

According to this aspect, the first set of one or more source code files may include a modification to one or more prior source code files applied to the project database in response to the one or more prior pull requests.

According to this aspect, the second set of one or more source code files may be identified based at least in part on one or more respective file system locations of the first set of one or more source code files.

According to this aspect, the second set of one or more source code files may be identified based at least in part on one or more substrings included in respective file names of the first set of one or more source code files.

According to this aspect, the second set of one or more source code files may be identified based at least in part on respective file extensions of the first set of one or more source code files.

According to this aspect, the computing device may further include a display. The processor may be further configured to output for display on the display a GUI of the distributed version control system. The source code file recommendation notification may be included in the GUI.

According to this aspect, for each source code file of the second set of one or more source code files, the processor may be further configured to determine an estimated probability that a modification to the source code file will be added to the pull request. The second set of one or more source code files may be ranked in the source code file recommendation notification based on the respective estimated probabilities of each source code file being added to the pull request.

According to another aspect of the present disclosure, a method performed at a processor of a computing device is provided. The method may include executing a distributed version control system. The method may further include, via the distributed version control system, receiving a pull request to apply a first set of one or more source code files to a project database. In response to receiving the pull request, the method may further include identifying a second set of one or more source code files based at least in part on a recommendation ruleset including one or more association rules identified for a plurality of training pull requests applied to a training project database. The recommendation ruleset may be determined based at least in part on a respective last iteration of each training pull request. The method may further include outputting a source code file recommendation notification including an indication of each source code file of the second set of one or more source code files.

According to this aspect, each association rule included in the recommendation ruleset may have a confidence exceeding a predefined confidence threshold.

According to this aspect, each association rule included in the recommendation ruleset may have a lift exceeding a predefined lift threshold.

According to this aspect, the first set of one or more source code files may include a modification to one or more prior source code files applied to the project database in response to the one or more prior pull requests.

According to this aspect, the second set of one or more source code files may be identified based at least in part on one or more respective file system locations of the first set of one or more source code files.

According to this aspect, the second set of one or more source code files may be identified based at least in part on one or more substrings included in respective file names of the first set of one or more source code files.

According to this aspect, each association rule included in the recommendation ruleset may have a support exceeding a predefined support threshold.

According to this aspect, the second set of one or more source code files may be identified based at least in part on one or more substrings included in respective file names of the first set of one or more source code files.

According to this aspect, the second set of one or more source code files may be identified based at least in part on respective file extensions of the first set of one or more source code files.

According to this aspect, the method may further include outputting a GUI of the distributed version control system for display on a display. The source code file recommendation notification may be included in the GUI.

According to another aspect of the present disclosure, a client computing device is provided, including a non-volatile storage device and a processor. The processor may be configured to execute a distributed version control system stored in the non-volatile storage device. The processor may be further configured to output for display on the display a graphical user interface (GUI) of the distributed version control system. Via the distributed version control system, the processor may be further configured to convey a pull request to apply a first set of one or more source code files to a project database stored at a server computing device. In response to conveying the pull request, the processor may be further configured to identify a second set of one or more source code files based at least in part on a recommendation ruleset including one or more association rules identified for a plurality of training pull requests applied to a training project database. The recommendation ruleset may be determined based at least in part on a respective last iteration of each training pull request. The processor may be further configured to output a source code file recommendation notification at the GUI, the source code file recommendation notification including an indication of each source code file of the second set of one or more source code files.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a non-volatile storage device; and
   a processor configured to:
   execute a distributed version control system stored in the non-volatile storage device;
   via the distributed version control system, receive a pull request to apply a first set of one or more source code files to a project database for a project;
   in response to receiving the pull request, identify a second set of one or more source code files based at least in part on a recommendation ruleset including one or more association rules identified by a machine learning algorithm,
   wherein the machine learning algorithm is trained using a plurality of training pull requests applied to a training project database for a training project that is different than the project database for the project,
   wherein the recommendation ruleset is determined based only on a respective last iteration of each training pull request; and
   output a source code file recommendation notification including an indication of each source code file of the second set of one or more source code files.

2. The computing device of claim 1, wherein each association rule included in the recommendation ruleset has a support exceeding a predefined support threshold.

3. The computing device of claim 1, wherein each association rule included in the recommendation ruleset has a confidence exceeding a predefined confidence threshold.

4. The computing device of claim 1, wherein each association rule included in the recommendation ruleset has a lift exceeding a predefined lift threshold.

5. The computing device of claim 1, wherein the first set of one or more source code files includes a modification to one or more prior source code files applied to the project database in response to one or more prior pull requests.

6. The computing device of claim 1, wherein the second set of one or more source code files are identified based at least in part on one or more respective file system locations of the first set of one or more source code files.

7. The computing device of claim 1, wherein the second set of one or more source code files are identified based at least in part on one or more substrings included in respective file names of the first set of one or more source code files.

8. The computing device of claim 1, wherein the second set of one or more source code files are identified based at least in part on respective file extensions of the first set of one or more source code files.

9. The computing device of claim 1, further comprising a display, wherein:
   the processor is further configured to output for display on the display a graphical user interface (GUI) of the distributed version control system; and
   the source code file recommendation notification is included in the GUI.

10. The computing device of claim 1, wherein:
    for each source code file of the second set of one or more source code files, the processor is further configured to determine an estimated probability that a modification to the source code file will be added to the pull request; and
    the second set of one or more source code files are ranked in the source code file recommendation notification based on the respective estimated probabilities of each source code file being added to the pull request.

11. A method performed at a processor of a computing device, the method comprising:
    executing a distributed version control system;
    via the distributed version control system, receiving a pull request to apply a first set of one or more source code files to a project database for a project;
    in response to receiving the pull request, identifying a second set of one or more source code files based at least in part on a recommendation ruleset including one or more association rules identified by a machine learning algorithm,
    wherein the machine learning algorithm is trained using a plurality of training pull requests applied to a training project database for a training project that is different than the project database for the project,
    wherein the recommendation ruleset is determined based only on a respective last iteration of each training pull request; and
    outputting a source code file recommendation notification including an indication of each source code file of the second set of one or more source code files.

12. The method of claim 11, wherein each association rule included in the recommendation ruleset has a support exceeding a predefined support threshold.

13. The method of claim 11, wherein each association rule included in the recommendation ruleset has a confidence exceeding a predefined confidence threshold.

14. The method of claim 11, wherein each association rule included in the recommendation ruleset has a lift exceeding a predefined lift threshold.

15. The method of claim 11, wherein the first set of one or more source code files includes a modification to one or more prior source code files applied to the project database in response to one or more prior pull requests.

16. The method of claim 11, wherein the second set of one or more source code files are identified based at least in part on one or more respective file system locations of the first set of one or more source code files.

17. The method of claim 11, wherein the second set of one or more source code files are identified based at least in part on one or more substrings included in respective file names of the first set of one or more source code files.

18. The method of claim 11, wherein the second set of one or more source code files are identified based at least in part on respective file extensions of the first set of one or more source code files.

19. The method of claim 11, further comprising outputting a graphical user interface (GUI) of the distributed version control system for display on a display, wherein the source code file recommendation notification is included in the GUI.

20. A client computing device, comprising:
a non-volatile storage device; and
a processor configured to:
    execute a distributed version control system stored in the non-volatile storage device;
    output for display on a display a graphical user interface (GUI) of the distributed version control system;
    via the distributed version control system, convey a pull request to apply a first set of one or more source code files to a project database for a project stored at a server computing device;
    in response to conveying the pull request, identify a second set of one or more source code files based at least in part on a recommendation ruleset including one or more association rules identified by a machine learning algorithm,
    wherein the machine learning algorithm is trained using a plurality of training pull requests applied to a training project database for a training project that is different than the project database for the project,
    wherein the recommendation ruleset is determined based only on a respective last iteration of each training pull request; and
    output a source code file recommendation notification at the GUI, the source code file recommendation notification including an indication of each source code file of the second set of one or more source code files.

* * * * *